(12) United States Patent
Malakian et al.

(10) Patent No.: US 8,035,549 B1
(45) Date of Patent: Oct. 11, 2011

(54) DROP TRACK TIME SELECTION USING SYSTEMS APPROACH

(75) Inventors: Kourken Malakian, Mount Laurel, NJ (US); Stephen J. Salvatore, Mount Laurel, NJ (US)

(73) Assignee: Lockheed Martin Corporation, Bethesda, MD (US)

( * ) Notice: Subject to any disclaimer, the term of this patent is extended or adjusted under 35 U.S.C. 154(b) by 77 days.

(21) Appl. No.: 12/578,241

(22) Filed: Oct. 13, 2009

(51) Int. Cl.
*G01S 13/66* (2006.01)

(52) U.S. Cl. ............. 342/95; 342/97; 342/106; 342/195
(58) Field of Classification Search .................... 342/90, 342/95–97, 62, 106–112, 140, 195
See application file for complete search history.

(56) References Cited

U.S. PATENT DOCUMENTS

| | | | |
|---|---|---|---|
| 4,041,487 A * | 8/1977 | Evans et al. ...................... 342/91 |
| 4,148,026 A | 4/1979 | Gendreu |
| 4,224,507 A | 9/1980 | Gendreu |
| 4,783,744 A | 11/1988 | Yueh |
| 5,317,316 A * | 5/1994 | Sturm et al. ..................... 342/30 |
| 5,321,406 A * | 6/1994 | Bishop et al. .................... 342/32 |
| 5,414,643 A * | 5/1995 | Blackman et al. ............... 342/95 |
| 5,424,742 A | 6/1995 | Long et al. |
| 5,430,445 A | 7/1995 | Peregrim et al. |
| 5,519,618 A * | 5/1996 | Kastner et al. ................. 701/120 |
| 5,920,278 A | 7/1999 | Tyler et al. |
| 5,960,097 A * | 9/1999 | Pfeiffer et al. ................ 382/103 |
| 6,262,680 B1 * | 7/2001 | Muto ............................. 342/74 |
| 6,483,453 B2 * | 11/2002 | Oey et al. ........................ 342/29 |
| 6,675,094 B2 * | 1/2004 | Russell et al. ................ 701/301 |
| 6,714,155 B1 | 3/2004 | Rose |
| 7,009,554 B1 | 3/2006 | Mookerjee et al. |
| 7,016,884 B2 | 3/2006 | Platt et al. |
| 7,026,980 B1 | 4/2006 | Mavroudakis et al. |
| 7,180,443 B1 | 2/2007 | Mookerjee et al. |
| 7,250,902 B2 | 7/2007 | Manoogian et al. |
| 7,295,149 B1 | 11/2007 | Wolf |
| 7,394,047 B1 | 7/2008 | Pedersen |
| 7,511,252 B1 | 3/2009 | Pedersen et al. |
| 7,623,061 B2 * | 11/2009 | Spyropulos et al. ............ 342/70 |
| 7,663,528 B1 * | 2/2010 | Malakian et al. ............... 342/13 |
| 7,798,043 B1 * | 9/2010 | Malakian et al. ............. 89/1.11 |
| 7,898,466 B1 * | 3/2011 | Malakian et al. ............... 342/95 |
| 2007/0018882 A1 | 1/2007 | Manoogian et al. |
| 2007/0253625 A1 | 11/2007 | Yi |
| 2010/0332125 A1 * | 12/2010 | Tan et al. ....................... 701/207 |

OTHER PUBLICATIONS

"Tracking unresolved targets in theater ballistic missile defense", Belcher, M.; System Theory, 1997., Proceedings of the Twenty-Ninth Southeastern Symposium on , Publication Year: 1997, pp. 426-429.*
"Performance bounds and comparison of nonlinear filters for tracking a ballistic object on re-entry", Ristic, B.; Farina, A.; Benvenuti, D.; Arulampalam, M.S.; Radar, Sonar and Navigation, IEE Proceedings—vol. 150 , Issue: 2 Publication Year: 2003, pp. 65-70.*

* cited by examiner

*Primary Examiner* — John B Sotomayor
(74) *Attorney, Agent, or Firm* — Howard IP Law Group, PC

(57) ABSTRACT

A method for calculating a drop track time for a radar system includes receiving characteristics of the radar system as an input, determining in a computer process the characteristics of a target being tracked by the radar system, calculating in a computer process a target track drop time for the target based on the characteristics of the radar system and the target, determining in a computer process whether a value associated with the target being tracked has been updated within the target track drop time, and discontinuing the tracking of the target if a value associated with the target being tracked is not updated within the target track drop time.

14 Claims, 7 Drawing Sheets

DROP TRACK TIME SELECTION USING SYSTEMS APPROACH

STATEMENT REGARDING FEDERALLY SPONSORED RESEARCH OR DEVELOPMENT

This invention was made with Government Support under Contract No. N00024-98-C-5197 awarded by the Department of the Navy. The Government has certain rights in this invention.

FIELD OF DISCLOSURE

The system and method relate to radar, and more specifically, the system and method relate to determining the drop track time for a radar system.

BACKGROUND

Defense systems commonly include a radar system and a weapons system. The radar system detects and tracks objects, e.g., a missile, plane, boat, or the like, by periodically transmitting beams of electromagnetic waves in a certain direction from radar sensors. The beams of electromagnetic waves have certain sweep areas or beam widths. Objects within the beam width cause an electromagnetic wave to be reflected back towards the radar sensors. The radar system filters the received waves and uses the characteristics of the received waves to determine the location of the object as well as the object's speed and trajectory. The radar system adjusts the direction in which the radar sensors transmits the electromagnetic beam based on the location, speed, and trajectory of the object, as previously determined. In this manner, the radar system tracks a moving object.

The information gathered by the radar system is also used by a weapons system for targeting of the object being tracked. In a multi-function, multi-target radar system, e.g., a defense radar system during a battle, radar resources such as the electromagnetic energy transmitted at a target and computing resources used to track and destroy targets are limited and must be carefully utilized.

Conventional radar systems typically track an object until the object is destroyed or after a predetermined time after losing track of the object (i.e., a drop track time). In these conventional radar systems, the drop track time is typically a function of a threshold miss value that is set by the radar designers. For example, a radar designer may program the radar system to stop tracking an object after ten consecutive signals are received that fail to include data about the object being tracked. Accordingly, if a radar system has a 1 Hz look rate, e.g., the radar system transmits an electromagnetic wave once every second, then the drop track time of the radar system would be ten seconds (e.g., 10 misses×1 second=10 seconds). Thus, the radar system will continue tracking an object for the entire ten seconds even if the time at which the object could no longer be tracked is significantly shorter than the drop track time due to accumulating errors that cause the radar system to look for the object in a wrong direction. Continuing to track objects that have little-to-no chance of being detected wastes valuable radar resources that could be redeployed to track other objects.

Accordingly, an improved system and method of determining which radar tracks should be dropped is desirable.

SUMMARY

In some embodiments, a method for calculating a drop track time for a radar system includes receiving characteristics of the radar system as an input, determining in a computer process the characteristics of a target being tracked by the radar system, calculating in a computer process a target track drop time for the target based on the characteristics of the radar system and the target, determining in a computer process whether a value associated with the target being tracked has been updated within the target track drop time, and discontinuing the tracking of the target if a value associated with the target being tracked is not updated within the target track drop time.

In some embodiments, a system for determining a target track drop time includes a computer readable storage medium and a processor in data communication with the computer readable storage medium and a radar system. The processor configured to receive characteristics of a radar system as an input, determine the characteristics of a target being tracked by the radar system based on data received from the radar system, calculate a target track drop time for the target based on the characteristics of the radar tracking system and the target, and cause the radar system to discontinue the tracking of the target if a value associated with the target being tracked is not updated within the target track drop time.

The above and other features of the present invention will be better understood from the following detailed description of the preferred embodiments that is provided in connection with the accompanying drawings.

BRIEF DESCRIPTION OF THE DRAWINGS

The accompanying drawings illustrate preferred embodiments of the invention, as well as other information pertinent to the disclosure, in which.

DETAILED DESCRIPTION

This description of the exemplary embodiments is intended to be read in connection with the accompanying drawings, which are to be considered part of the entire written description. The disclosed system and method work to conserve valuable radar resources by calculating a drop track time based on the characteristics of the radar system and of the target being tracked instead of being based on an arbitrary number set by the programmer of a radar system. In battle scenarios, the radar resources that are conserved as a results of the drop track time calculation may be advantageously redeployed to create a more efficient and accurate defense system.

Figure 1A:
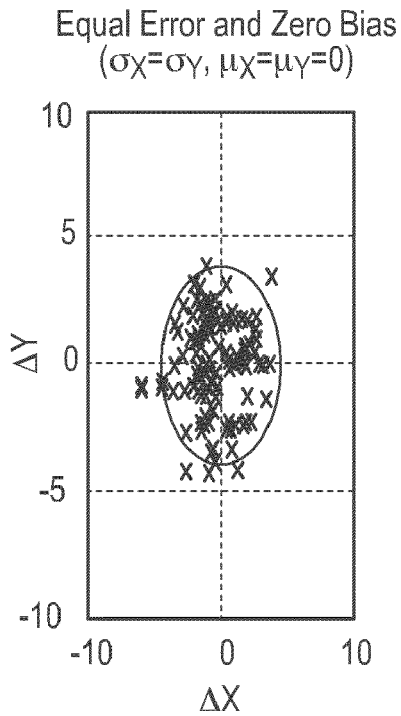
FIGS. 1A-1C illustrate the position errors for an inertial navigation receiver having different error and biases.

The drop track time calculation is based on the calculation of circular and spherical error containment probabilities from error statistics. For example, suppose x and y respectively represent the North and East displacement of a crater caused by the impact of an artillery shell fired against a stationary target, and assume that several shots have been fired so that there exists some distribution of x and y as illustrated in FIG. 1A and that x and y possess the following statistics:

$$x = N(\mu_x, \sigma_x^2) \quad \text{Eq. 1}$$

$$y = N(\mu_y, \sigma_y^2) \quad \text{Eq. 2}$$

Where, $\mu_x$ is the mean value of x;
$\sigma_x$ is the standard deviation of x;
$\mu_y$ is the mean value of y; and
$\sigma_y$ is the standard deviation of y.

A practical way of quantifying the accuracy of the cannon which fired the shots is to count the number of craters that lie inside a circle centered about the target with some radius R and to compute the percentage of those craters out of the total number of craters. An accurate cannon would have, for example, 90 percent of the total number of shots within a radius of 50 feet from the target while a less accurate cannon would have, for example, 40 percent in that same circle. The percentage may be calculated directly from the error statistics $\mu_x$, $\mu_y$, $\sigma_x$, and $\sigma_y$ and the circle radius R by integrating the joint probability density function (PDF) in x and y, f(x, y) over R. The densities of x and y may be calculated as follows:

$$f(x) = \frac{1}{\sqrt{2\pi}\,\sigma_x} e^{\left[\frac{(x-\mu_x)^2}{2\sigma_x^2}\right]} \qquad \text{Eq. 3}$$

$$f(y) = \frac{1}{\sqrt{2\pi}\,\sigma_y} e^{\left[-\frac{(y-\mu_y)^2}{2\sigma_y^2}\right]} \qquad \text{Eq. 4}$$

Assuming that x and y are statistically independent, then the joint PDF is simply the product of f(x) and f(y), which is as follows:

$$f(x, y) = \frac{1}{\sqrt{2\pi}\,\sigma_x \sigma_y} e^{\left[-\frac{1}{2}\left(\frac{(y-\mu_y)^2}{2\sigma_y^2} + \frac{(x-\mu_x)^2}{2\sigma_x^2}\right)\right]} \qquad \text{Eq. 5}$$

The probability of x and y both being contained within a circle having a radius, R, e.g., containment probability P, may be calculated by:

$$P(x^2+y^2 \leq R) = \iint_{x^2+y^2 \leq R^2} f(x,y)\,dx\,dy \qquad \text{Eq. 6}$$

Figure 1B:
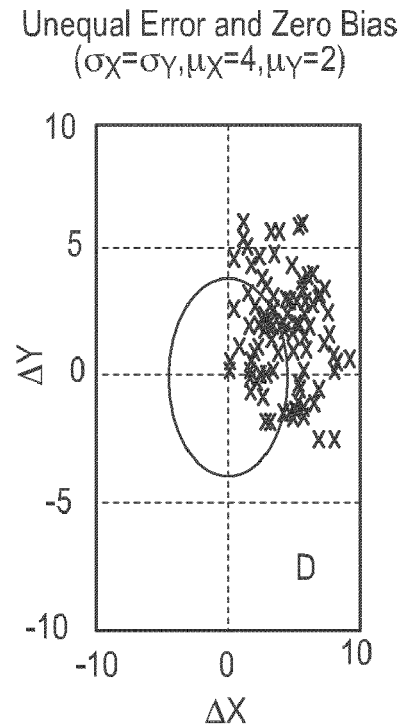
Figure 1C:
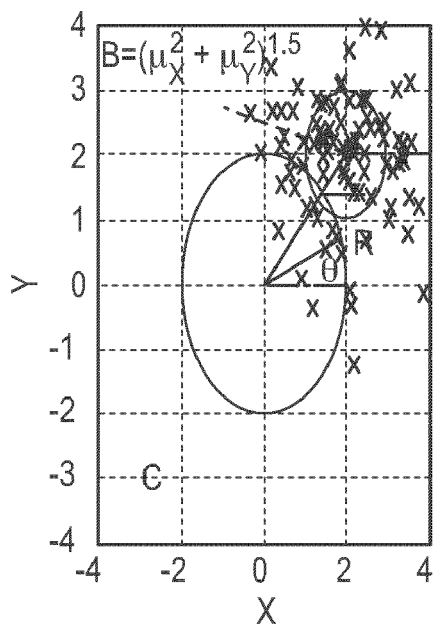

For radar tracking of a target that is performing a constant maneuver, it can be assumed that the standard deviation errors in the x and y directions are equal to each other, e.g., $\sigma_x = \sigma_y = \sigma$, but bias error, e.g., $\mu_x$ and $\mu_y$, is non-zero as illustrated in FIGS. 1B and 1C since the azimuth and elevation channels of a radar have equal random pointing error magnitudes. However, un-modeled target acceleration introduces a lag in the tracking filter and manifests as a pointing error bias. The total pointing accuracy of the combined radar-filter subsystem may be expressed in terms of the circle that contains a percentage of the combined random and bias pointing errors. For example, the circle may contain 95 percent of the combined random and bias pointing errors. This containment probability is a configurable parameter that may be selected as described below in connection with FIG. 2.

Using Ricean random variable synthesis, the joint PDF of x and y may be written as follows:

$$f(x, y) = \frac{1}{2\pi\sigma^2} e^{\left[-\left(\frac{(y-\mu_y)^2 + (x-\mu_x)^2}{2\sigma^2}\right)\right]} \qquad \text{Eq. 7}$$

The combined bias errors, B, may be written as:

$$B = \sqrt{\mu_x^2 + \mu_y^2} \qquad \text{Eq. 8}$$

Expanding the exponent in Equation 7 and substituting Equation 8 into Equation 7 provides:

$$f(x, y) = \frac{1}{2\pi\sigma^2} e^{\left[-\left(\frac{(x^2+y^2-2(x\mu_x+y\mu_y)+B^2)}{2\sigma^2}\right)\right]} \qquad \text{Eq. 9}$$

Equation 9 may be transformed into polar coordinates, where $x = r\cos(\theta+\varnothing)$, $y = r\sin(\theta+\varnothing)$, $\mu_x = B\cos\varnothing$, and $\mu_y = B\sin\varnothing$. The polar transform of Equation 9 is then substituted into Equation 6 yielding:

$$P(r \leq R) = \int_0^R \int_0^{2\pi} \frac{r}{2\pi\sigma^2} e^{-\frac{r^2 - 2rB\cos\theta + B^2}{2\sigma^2}} d\theta\, dr \qquad \text{Eq. 10}$$

The exponent in Equation 10 is separated and substituted into the following Bessel function:

$$I_0[x] = \frac{1}{2\pi} \int_0^{2\pi} e^{-x\cos\theta} d\theta \qquad \text{Eq. 11}$$

The separation of the exponent in Equation 10 and substitution into Equation 11 yields:

$$I_0\left[\frac{rB}{\sigma^2}\right] = \frac{1}{2\pi} \int_0^{2\pi} e^{\frac{rB}{\sigma^2}\cos\theta} d\theta \qquad \text{Eq. 12}$$

Accordingly, the probability, P, of containing x and y with equal standard errors and non-zero error bias within a circle having a radius, R, can be calculated by:

$$P(r < R) = \int_0^r \frac{r}{\sigma^2} e^{-\frac{r^2+B^2}{2\sigma^2}} I_0\left[\frac{rB}{\sigma^2}\right] dr \qquad \text{Eq. 13}$$

Figure 2:
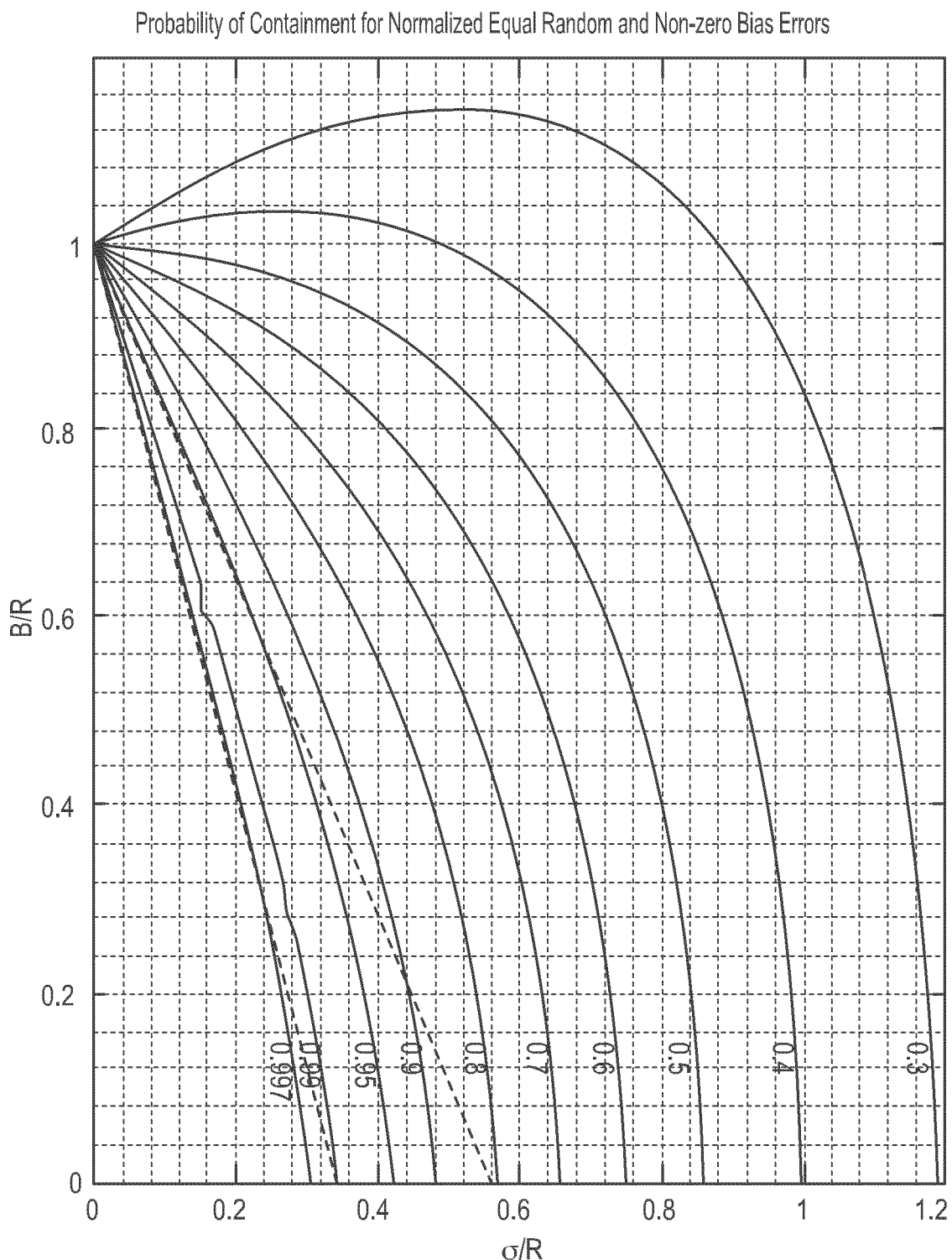
FIG. 2 is a graph of the probability of containment for normalized equal random and non-zero bias errors.

Equation 13 is known as a Ricean distribution. FIG. 2 illustrates a graph of Equation 13 for normalized standard error, $\sigma/R$, and normalized error bias, $B/R$. The two dashed lines in FIG. 2 are the linear approximations for the 99.7 percent and 95 percent curves. The 99.7 percent line has a slope of approximately $-2.915$ (e.g., $-1/0.343$), and the 95 percent line has a slope of approximately $-1.786$ (e.g., $-1/0.56$). Accordingly, the two useful approximations to the radii of the circle that contains 99.7 percent and 95 percent of a Rice distributed random variable, respectively, are:

$$R_{99.7\%} \approx 2.915\sigma + B$$

$$R_{95\%} \approx 1.786\sigma + B$$

For radar systems, the following requirement must be met in order to maintain the target within the beam of the radar:

$$k\sigma_{XP} + \frac{b_{XP}}{S} \leq \frac{1}{2}BW \qquad \text{Eq. 14}$$

Where, k is the containment probability factor,
$\sigma_{XP}$ is the filter prediction or propagation standard deviation, $b_{XP}$ is the filter prediction bias, which is a function of the object track acceleration, A, the track filter lag, $\tau$, and the object track drop time, t, BW is the beam-width of the electromagnetic wave in radians, and S is the predicted target slant range in meters.

The containment probability factor, k, may be determined by selecting a desired containment probability and computing the slope k using FIG. 2 as described above. For example, for a 99.7 percent containment probability, a value of 2.915 would be selected for k, and for a 95 percent containment probability, a value of 1.786 would be selected for k in accordance with FIG. 2. In order to select the drop track time, the left side of the equation is set equal to the right side of the equation such that:

$$k\sigma_{XP} + \frac{b_{XP}}{S} = \frac{1}{2} BW \qquad \text{Eq. 15}$$

The filter prediction standard deviation may be calculated according to:

$$\sigma_{XP} = \sqrt{\sigma_x^2 + 2t\sigma_{X\dot{X}} + t^2 \sigma_{\dot{X}\dot{X}}^2} \qquad \text{Eq. 16}$$

Where, $$\sigma_{\dot{X}}^2 = \frac{3T}{2\tau}\sigma_A^2 \qquad \text{Eq. 16.1}$$

$$\sigma_{X\dot{X}} = \frac{T}{\tau^2}\sigma_A^2 \qquad \text{Eq. 16.2}$$

$$\sigma_{\dot{X}}^2 = \frac{\tau}{\tau^3}\sigma_A^2 \qquad \text{Eq. 16.3}$$

$$\tau = T^{\frac{1}{5}}\left(\frac{3nS\sigma_A}{2A}\right)^{\frac{2}{5}} \qquad \text{Eq. 16.4}$$

Where, t is the selected drop track time in seconds, n is the filter factor,

A is the target acceleration in meters per second, $\sigma_A$ is the angle error standard deviation in radians, T is the look rate of the radar system in seconds, and $\tau$ is the filter lag in seconds.

The filter factor, n, is selected based on the desired error containment probability for the system. For example, to achieve a value of 95 percent containment probability, a value of 1.786 would be selected for n in accordance with FIG. 2, which may be written as $$P(|X| \leq n\sigma_{XX} + b_{XX}) \qquad \text{Eq. 17}$$

Where, $b_{X\dot{X}} = A\tau$

For a case with zero bias, e.g., $b_{X\dot{X}} = 0$, the value of n is selected with the expression given by $$P(|X| \leq n\sigma_{\dot{X}}) = \text{erf}\left(\frac{n}{\sqrt{2}}\right) \qquad \text{Eq. 18}$$

Where, erf is the Gauss error function.

The bias associated with the filter may be calculated according to:

$$b_{XP} = \frac{1}{2}A(t+\tau)^2 \qquad \text{Eq. 19}$$

Equations 15-16.4 and 19 are used to calculate a drop track time by substituting Equations 16-17 into Equation 15 and solving for t. For example, Equations 16.1-16.4 and 19 are initially substituted into Equation 15, which is then rearranged to solve for the beam width, BW. After simplifying, the following equation describes the beam width:

$$BW = \frac{KS\sqrt{2}\sqrt{\left(\frac{T\sigma_A^2(3\tau^4 + 4t\tau + 2t^2)}{\tau^3}\right) + A\tau^2 + 2At\tau + A\tau^2}}{S} \qquad \text{Eq. 20}$$

Substituting Equation 16.4 for $\tau$ in Equation 20 provides:

$$BW = \qquad \text{Eq. 21}$$

$$\frac{K}{12}\sqrt{27\sigma_A^2 T^{\frac{6}{5}}\left(\frac{nS\sigma_A}{A}\right)^{\frac{2}{5}} 72^{\frac{1}{5}} + 24\frac{48^{\frac{1}{5}} t\sigma_A^2 (T^3)^{\frac{1}{5}}}{\left(\frac{nS\sigma_A}{A}\right)^{\frac{4}{5}}} + 8\frac{162^{\frac{1}{5}} t^2 \sigma_A A(T^2)^{\frac{1}{5}}}{nR\left(\frac{nS\sigma_A}{A}\right)^{\frac{1}{5}}} + \frac{A\left(t + 72^{\frac{1}{2}}\left(\frac{nS\sigma_A}{2A}\right)^{\frac{2}{5}} T^{\frac{1}{2}}\right)^2}{4S}}$$

Rearranging Equation 21 to solve for the target drop track time, t, yields:

$$t = \sqrt{S\left(\frac{A \cdot BW \cdot \tau^3 + 2 \cdot T \cdot \sigma_A^2 \cdot K^2 \cdot S - \sqrt{2}\,\sigma_A \cdot}{K\sqrt{\frac{(T(2\tau^3 \cdot BW \cdot S \cdot A +}{2T \cdot \sigma_A^2 \cdot K^2 \cdot S^2 - 2\tau^5 \cdot A^2 + 3\tau^7 \cdot A^2))}}}{(\tau \cdot A)}\right)} - \tau \qquad \text{Eq. 22}$$

Equation 22 provides an expression that may be used to calculate the drop track time, t, for an object being tracked by a radar system that is based on the characteristics of the radar system and the object. Specifically, the drop track time as determined in accordance with Equation 22 identifies the time at which accumulated errors due to characteristics of the radar system and the target increase to a point where the target cannot be expected to be located within the beam width of the electromagnetic wave transmitted by the radar system. Accordingly, any further tracking of the target by radar system past the drop track time calculated in accordance with Equation 20 will waste valuable system resources as the target track is likely lost.

Figure 3:
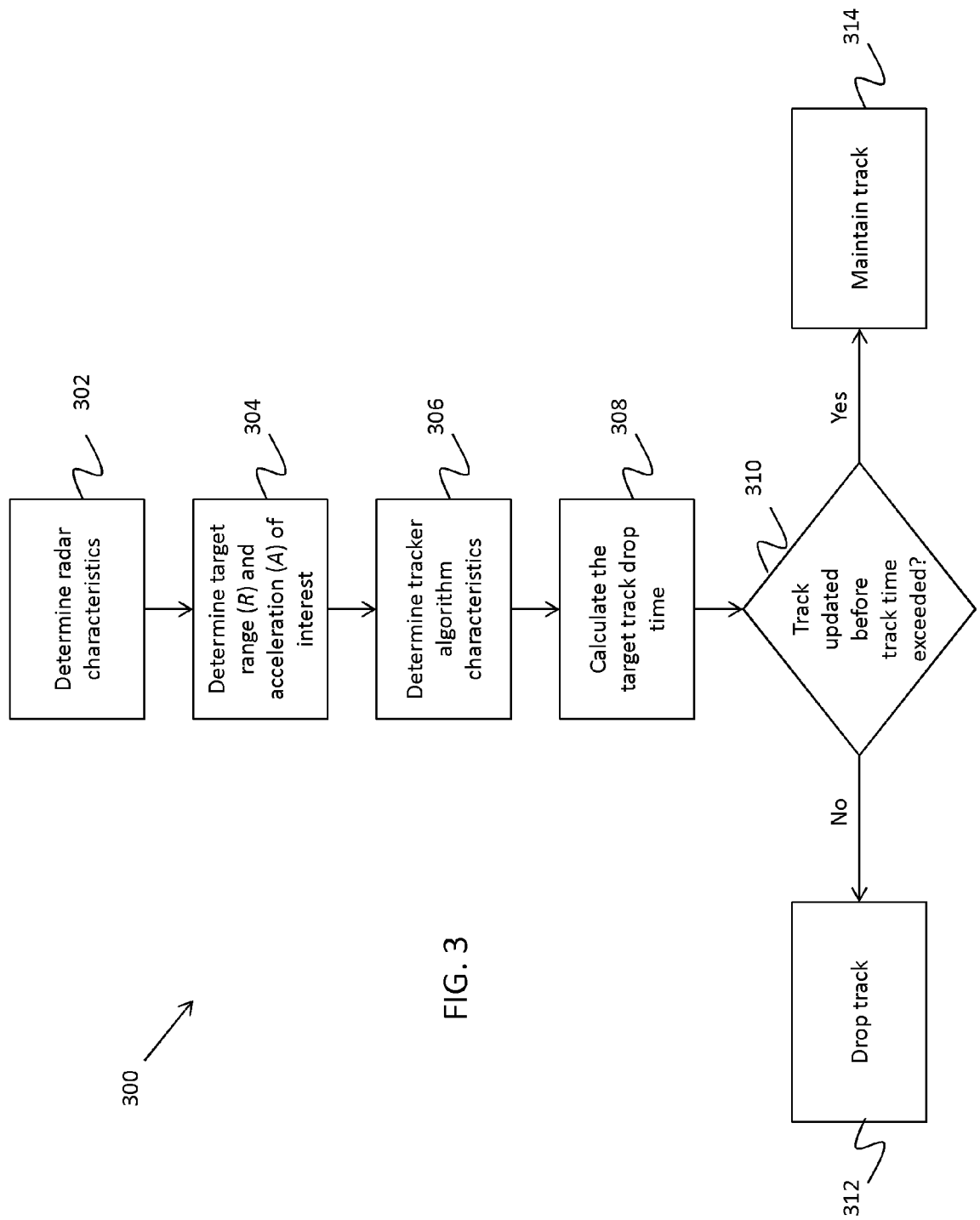
FIG. 3 is a flow diagram of one example of a method of dropping a radar track performed by a radar system.

FIG. 3 illustrates one example of a method 300 of tracking a target that may be performed by a radar system. At block 302, the radar system determines the radar characteristics including the angle error standard deviation ($\sigma_A$), look rate (T), and beam-width (BW). For example, the angle error standard deviation may be retrieved from a look-up table using the signal-to-noise ratio ("SNR") of the target and tracking waveform as an input. The beam-width (BW) may be determined by dividing the operational wavelength of the transmitted electromagnetic wave, λ, by the aperture width, L, of the radar sensor transmitting the electromagnetic wave.

At block 304, the range, S, and acceleration, A, of the target are determined from the reflected electromagnetic waves received by the radar sensors of the radar system. The bias errors (B) and containment probability factor (k) are determined at block 306. The bias errors may be calculated in accordance with Equation 8, and the containment probability factor may be calculated in accordance with Equation 13 as described above.

At block 308, the target track drop time, t, is calculated in accordance with Equation 20 and may subsequently be stored in a computer readable storage medium. The radar system will continue tracking a target as described above while calculating the drop track time, t. For example, the radar system will calculate the next location of the target based on the previously received information and adjust the beam direction. At decision block 310, the radar system determines if the target track has been updated. Put another way, the radar system will determine if information concerning the target was included in a reflected electromagnetic wave received by the radar sensors of the radar system subsequent to the calculation of the drop track time.

If the track has been updated, then at block 314 the target track is maintained and the radar system continues to monitor and track the target as described above at block 314. However, if the track is not updated before the drop track time, t, is exceeded, then the target track is dropped at block 312. Dropping a target track if it is not updated within the calculated drop track time, t, enables a radar system to reallocate resources from unreliable target tracks (e.g., target tracks with exceedingly high errors) to more reliable target tracks.

Table 1 lists the inputs for determining the drop track time, and Table 2 provides some example calculations of the drop track time, t.

TABLE 1

Drop Track Time Selection Input Parameters

| Radar System Parameter | Units |
|---|---|
| K, containment probability factor | unitless |
| n, filter factor | unitless |
| S, target slant range | meters |
| BW, beam width | radians |
| T, look rate | seconds |
| $\sigma_A$ angle error standard deviation | radians |
| A, target acceleration | m/s |

TABLE 2

Drop Track Time Selection Example Cases

| Case | K | N | BW (deg) | T (s) | S (km) | $\sigma_A$ (mrad) |
|---|---|---|---|---|---|---|
| 1 | 3 | 3 | 2 | 0.0625-4 | 10-400 | 1-4 |
| 2 | 2 | 2 | 2 | 0.0625-4 | 10-400 | 1-4 |
| 3 | 3 | 3 | 1 | 0.0625-4 | 10-400 | 1-4 |
| 4 | 2 | 2 | 1 | 0.0625-4 | 10-400 | 1-4 |

Figure 4B:
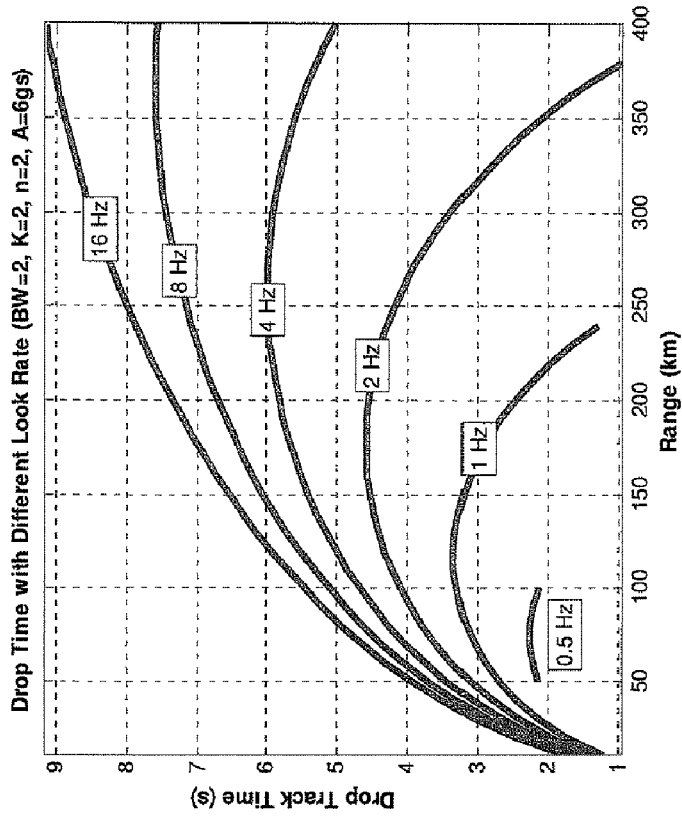
FIGS. 4A-4D are plots of drop track time versus range for radar systems and targets having various characteristics.
Figure 4A:
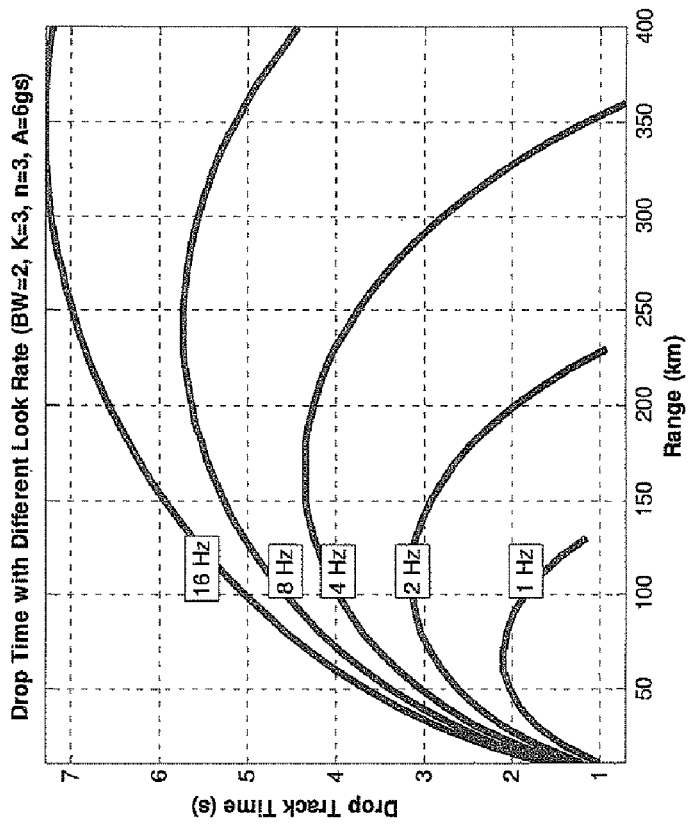

FIG. 4A illustrates the capability of a radar system to track target maneuvers given look rates between 1 Hz and 16 Hz. For example, the drop track time, t, is approximately 4.5 seconds or about 36 consecutive missed detections for a target at 400 km and a radar system having an 8 Hz radar look rate.

Figure 4D:
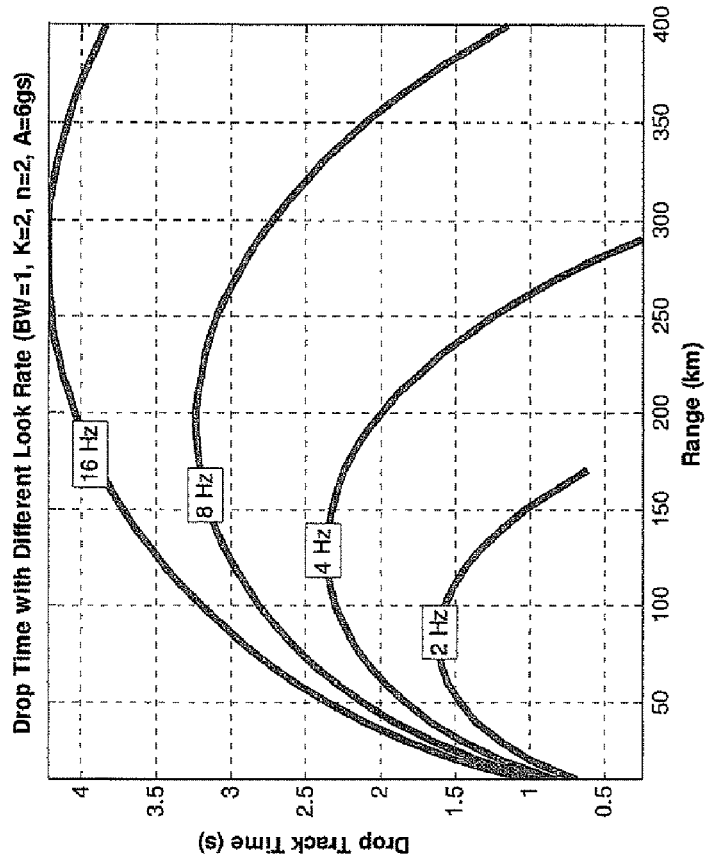
Figure 4C:
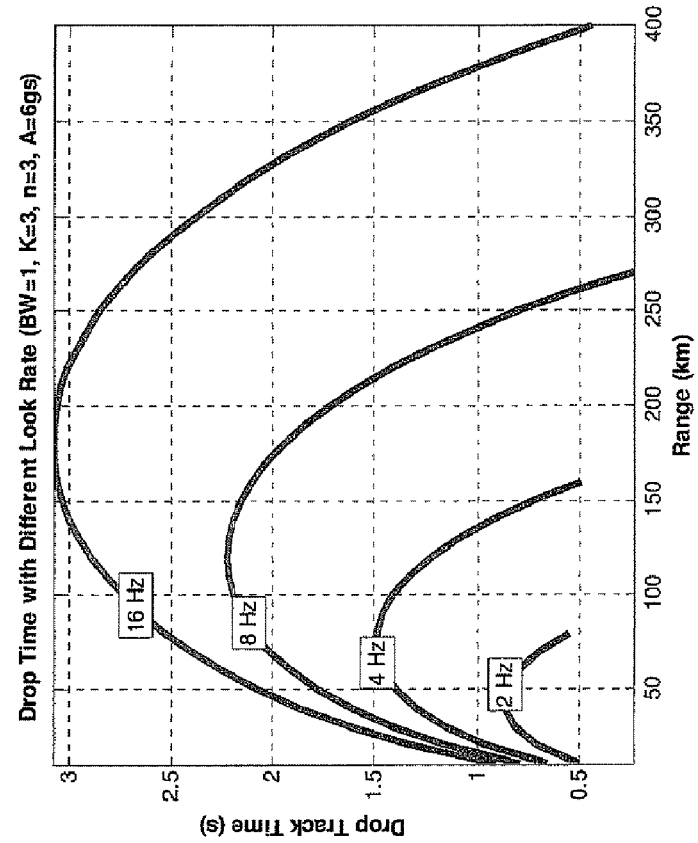
Figure 5:
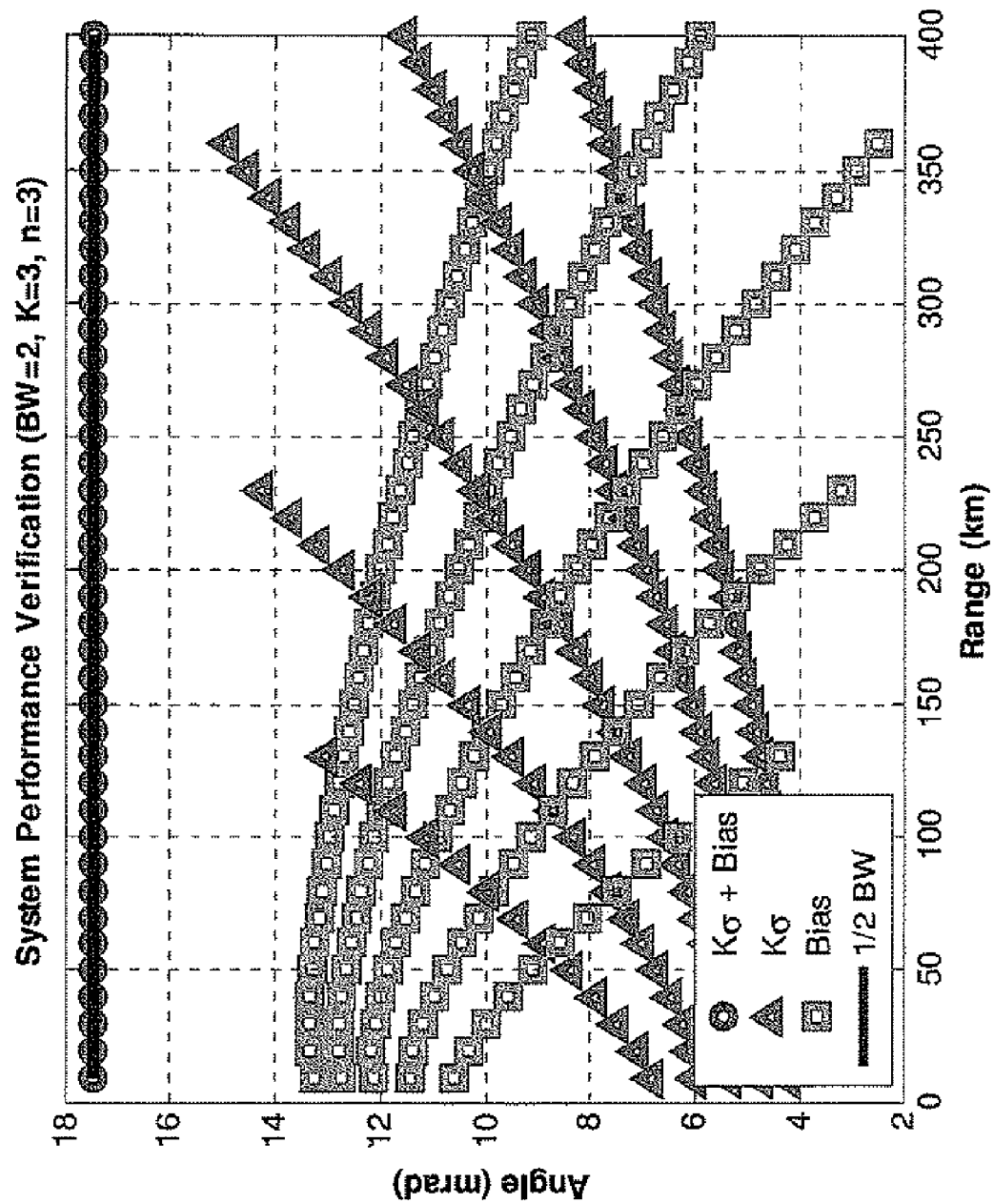
FIG. 5 is a plot of angle versus range for the radar tracking scenario illustrated in FIG. 4A.

FIG. 5 illustrates the verification results showing that the 3 sigma plus bias meets the ½ beam width requirement for case 1 in Table 2. FIGS. 4B-4D illustrate the radar system capability to track target maneuvers for cases 2 through 4 as shown in Table 2.

Figure 6:
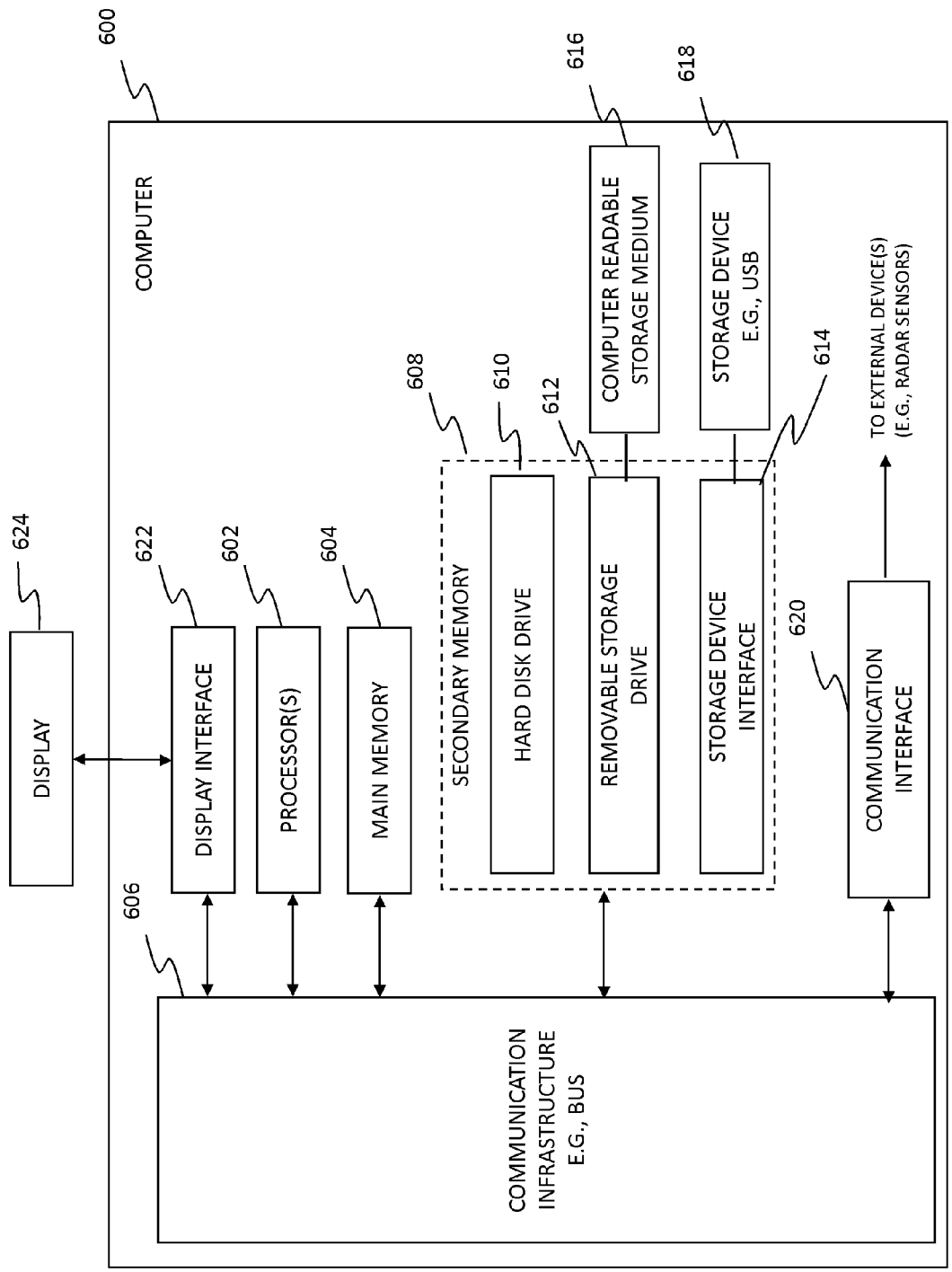
FIG. 6 is one example of a computer architecture.

The above-described method 300 of dropping target tracks may be implemented using hardware, software, or a combination thereof and may be implemented in one or more computer systems or other processing systems. In one embodiment, the method 300 is carried out in a computer system. FIG. 6 illustrates one example of an architecture of a computer system 600 that may be configured to perform the method described herein. As shown in FIG. 6, computer system 600 may include one or more processors, such as processor(s) 602, which may be configured to run a multitasking operating system. The processor(s) 602 are connected to a communication infrastructure 606 (e.g., a communications bus, cross-over bar, or network). Various software embodiments are described in terms of this exemplary computer system. After reading this description, it will be apparent to one skilled in the art how to implement the method using other computer systems or architectures.

Computer system 600 can include a display interface 622 that forwards graphics, text, and other data from the communication infrastructure 606 (or from a frame buffer not shown) for display on a display unit 626.

Computer 600 may include a main memory 604, such as a random access (RAM) memory. Computer 600 may also include a secondary memory 608, which may be a more persistent memory than main memory 604. The secondary memory 608 may include, for example, a hard disk drive 610 and/or removable storage drive 612, representing a floppy disk drive, a magnetic tape drive, an optical disk drive, ZIP™ drive, or the like. The removable storage drive 612 reads from and/or writes to a removable computer readable storage unit 616 in a known manner. Removable computer readable storage unit 616 represents a floppy disk, magnetic tape, optical disk, ZIP™ disk, or the like, which is read by and written to by removable storage drive 612. As will be appreciated, the removable computer readable storage unit 616 may have computer software and/or data stored therein.

In some embodiments, secondary memory 608 may include other similar devices for allowing computer programs or other instructions to be loaded into computer system 600. Such device may include, for example a removable storage unit 618 and a corresponding interface 614. Examples of such a removable storage unit and interface may include a universal serial bus (USB) memory device and corresponding interface, e.g., a USB port.

Computer system 600 may also include a communications interface 620, which allows software and data to be transferred between computer system 600 and external devices, such as radar sensors or other remote computer terminals. Examples of communications interface 620 may include a modem, a network interface (such as an Ethernet card), a communications port, a Personal Computer Memory Card International Association (PCMCIA) slot and card, or the like. Software and data transferred via communications interface 620 are in the form of signals which may be electronic, electromagnetic, optical, or other signals capable of being received by communications interface 620. These signals are provided to communications interface 620 via a communications path (e.g., channel), which may be implemented using wire or cable, fiber optics, a telephone line, a cellular link, a radio frequency (RF) link and other communication channels.

In this document, the terms "computer program medium" and "computer readable storage medium" refer to media such as removable storage drive 612, a hard disk installed in hard disk drive 610, and signals. These computer program products provide software to computer system 600. Computer programs (also referred to as computer control logic) are stored in main memory 604 and/or secondary memory 608. Computer programs may also be received via communications interface 620. Such computer programs, when executed by a processor 602, enable the computer system 600 to perform the features of the method discussed herein.

In an embodiment where the invention is implemented using software, the software may be stored in a computer readable storage medium, e.g., main memory 604 and/or secondary memory 608, and loaded into computer system 600 using removable storage drive 612, hard drive 610, or communications interface 620. The software, when executed by a processor(s) 602, causes the processor(s) 602 to perform the functions of the method described herein. In another embodiment, the method is implemented primarily in hardware using, for example, hardware components such as application specific integrated circuits (ASICs). Implementation of the hardware state machine so as to perform the functions described herein will be apparent to persons skilled in the art. In yet another embodiment, the method is implemented using a combination of both hardware and software.

Although the invention has been described in terms of exemplary embodiments, it is not limited thereto. Rather, the appended claims should be construed broadly, to include other variants and embodiments of the invention, which may be made by those skilled in the art without departing from the scope and range of equivalents of the invention.

What is claimed is:

1. A method for calculating a drop track time for a radar system, comprising:
   receiving characteristics of the radar system as an input;
   determining in a computer process the characteristics of a target being tracked by the radar system;
   calculating in a computer process the target track drop time for the target based on characteristics of the radar system and the target;
   determining in a computer process whether a value associated with the target being tracked has been updated within the target track drop time; and
   discontinuing the tracking of the target if the value associated with the target being tracked has not been updated within the target track drop time.

2. The method of claim 1, wherein the characteristics of the radar system include a beam width of an electromagnetic wave transmitted by the radar system and a look rate of the radar.

3. The method of claim 1, wherein determining the characteristics of the target being tracked includes calculating a range of the target and an acceleration of the target based on an electromagnetic wave received by the radar system.

4. The method of claim 1, wherein the target track drop time is calculated according to:

$$t = \sqrt{S\left(\dfrac{K\sqrt{\dfrac{A \cdot BW \cdot \tau^3 + 2 \cdot T \cdot \sigma_A^2 \cdot K^2 \cdot S - \sqrt{2}\,\sigma_A \cdot (T(2\tau^3 \cdot BW \cdot S \cdot A + 2T \cdot \sigma_A^2 \cdot K^2 \cdot S^2 - 2\tau^5 \cdot A^2 + 3\tau^7 \cdot A^2))}{\tau}}}{\tau \cdot A}\right)} - \tau$$

where,
t is the target track drop time,
A is an acceleration of the target,

BW is a beam width of an electromagnetic wave transmitted by the radar system,
$\sigma_A$ is an angle error standard deviation of the radar system,
T is a look rate of the radar system,
$\tau$ is a filter lag of the radar system,
S is a predicted target slant range, and
k is a containment probability factor.

5. The method of claim 4, wherein $\tau$ is calculated according to $$\tau = T^{\frac{1}{5}}\left(\dfrac{3nS\sigma_A}{2A}\right)^{\frac{2}{5}}.$$

6. The method of claim 1, further comprising:
   reassigning resources of the radar system to an active target track after discontinuing the tracking of the target.

7. The method of claim 1, further comprising:
   continuing to track the target if a value associated with the target being tracked is updated prior to the expiration of the target track drop time.

8. A system for determining a target track drop time for a radar system, comprising:
   a computer readable storage medium; and
   a processor in data communication with the computer readable storage medium and one or more radar sensors of the radar system, the processor configured to:
     receive characteristics of the radar system as an input;
     determine the characteristics of a target being tracked by the radar system based on data received from the radar sensors;
     calculate a target track drop time for the target based on the characteristics of the radar system and the target; and
     cause the radar system to discontinue the tracking of the target if a value associated with the target being tracked is not updated within the target track drop time.

9. The system of claim 8, wherein the characteristics of the radar system include a beam width of an electromagnetic wave transmitted by the radar system and a look rate of the radar system.

10. The system of claim 8, wherein the processor determines the characteristics of the target by calculating a range of the target and an acceleration of the target based on signals received by the radar sensors.

11. The system of claim 8, wherein the target track drop time is calculated according to:

$$t = \sqrt{S\left(\dfrac{K\sqrt{\dfrac{A \cdot BW \cdot \tau^3 + 2 \cdot T \cdot \sigma_A^2 \cdot K^2 \cdot S - \sqrt{2}\,\sigma_A \cdot (T(2\tau^3 \cdot BW \cdot S \cdot A + 2T \cdot \sigma_A^2 \cdot K^2 \cdot S^2 - 2\tau^5 \cdot A^2 + 3\tau^7 \cdot A^2))}{\tau}}}{\tau \cdot A}\right)} - \tau$$

where,
t is the target track drop time,
A is an acceleration of the target,
BW is a beam width of an electromagnetic wave transmitted by the radar system,
$\sigma_A$ is an angle error standard deviation of the radar system, T is a look rate of the radar system,
τ is a filter lag of the radar system,
S is a predicted target slant range, and
k is a containment probability factor.

12. The system of claim 11, wherein τ is calculated according to $$\tau = T^{\frac{1}{5}} \left( \frac{3nS\sigma_A}{2A} \right)^{\frac{2}{5}}.$$

13. The system of claim 8, wherein the processor is configured to:
cause the radar system to reassign resources of the radar system to an active target track after discontinuing the tracking of the target.

14. The system of claim 8, wherein the processor is configured to cause the radar system to continue tracking the target.

* * * * *